Dec. 19, 1950 — L. J. SCHILLING — 2,534,927
MILKING TIMER
Filed Sept. 22, 1945 — 3 Sheets-Sheet 1
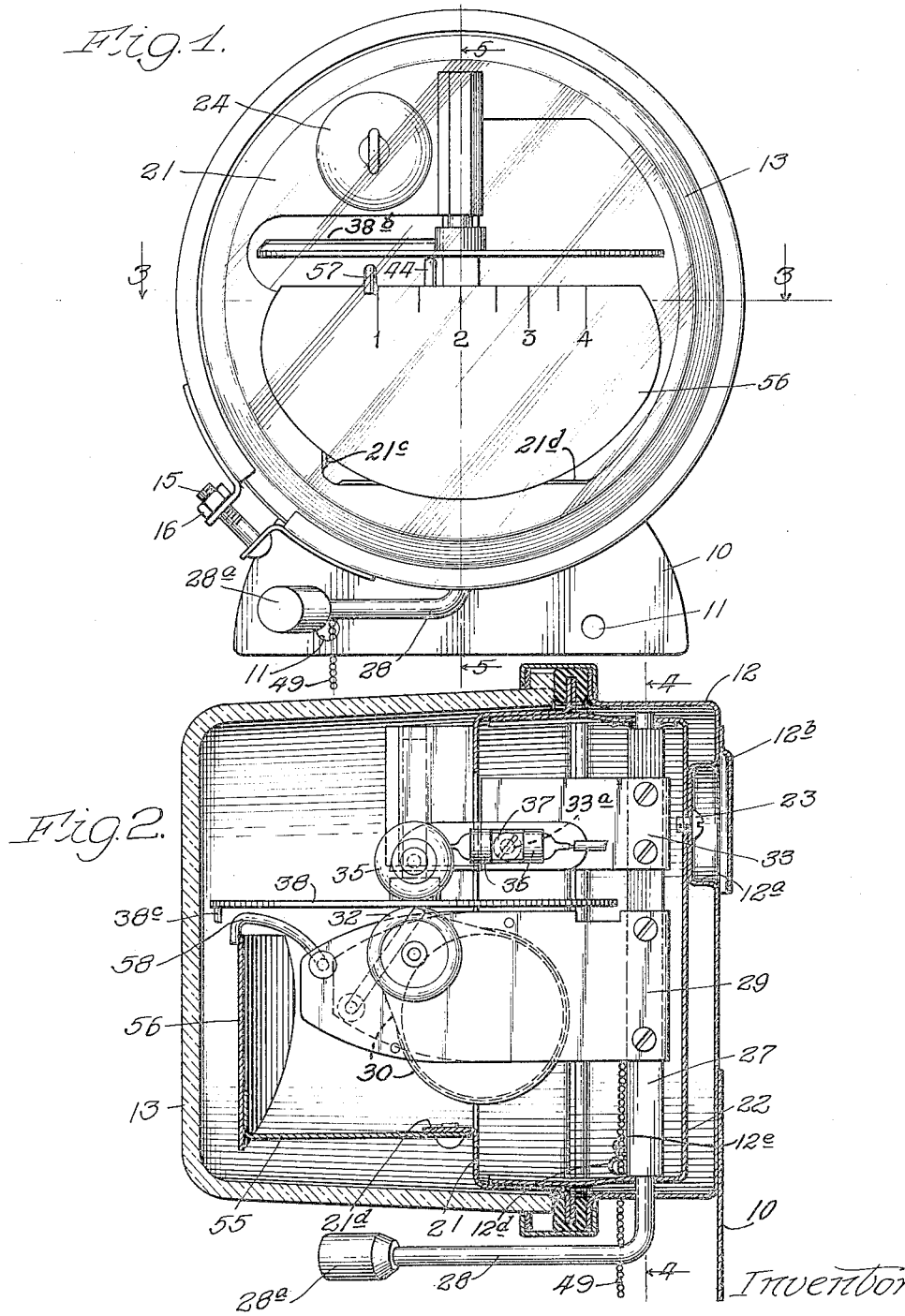
Inventor:
Lorell John Schilling.
By Chritton, Wiles, Schroeder, Merriam & Hofgren, Attys.

Dec. 19, 1950 — L. J. SCHILLING — 2,534,927
MILKING TIMER
Filed Sept. 22, 1945 — 3 Sheets-Sheet 2

Inventor:
Lorell John Schilling,
By Clinton, Wiles & Schroeder,
Merriam & Hofgren, Attys.

Dec. 19, 1950      L. J. SCHILLING      2,534,927
MILKING TIMER

Filed Sept. 22, 1945      3 Sheets-Sheet 3

Inventor:
Lorell John Schilling.
By Clinton, Wiles, Schroeder,
Merriam, Hagren, Attys.

Patented Dec. 19, 1950

2,534,927

UNITED STATES PATENT OFFICE 2,534,927

MILKING TIMER

Lorell John Schilling, Galesville, Wis., assignor to Babson Bros. Co., a corporation of Illinois Application September 22, 1945, Serial No. 618,027

12 Claims. (Cl. 161—23)

This invention relates to a milking timer, and more particularly to a milking timing arrangement designed for use in a dairy installation where one or a plurality of milkers are handled by a single operator during milking.

Figure 3:
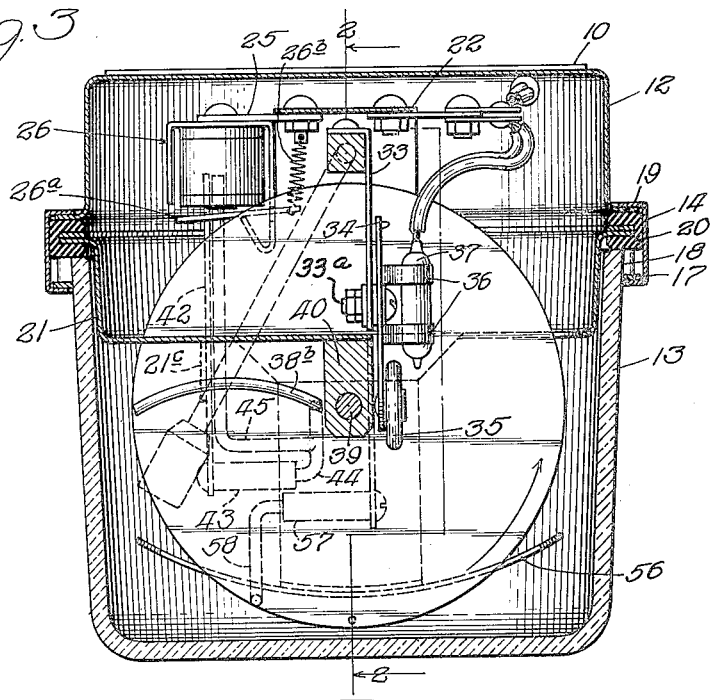
Figure 4:
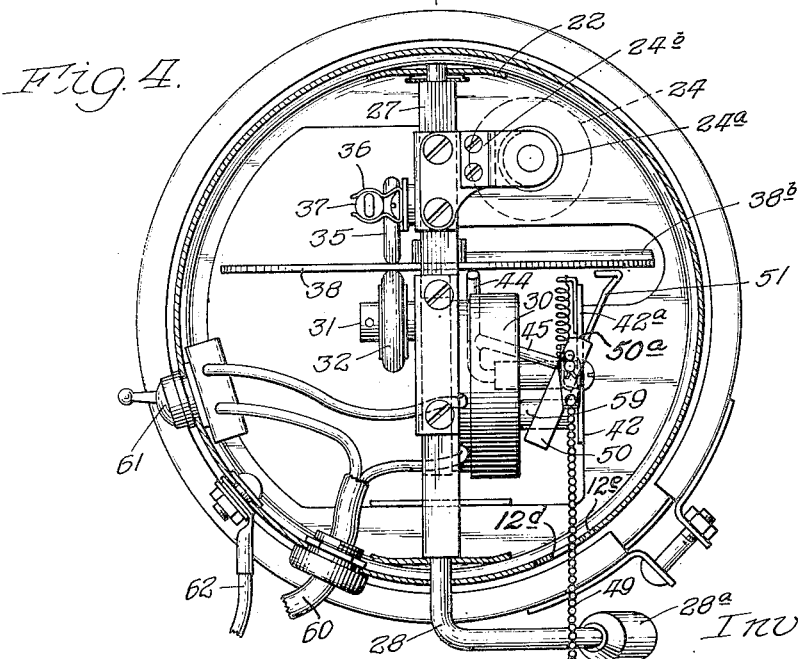
Figure 5:
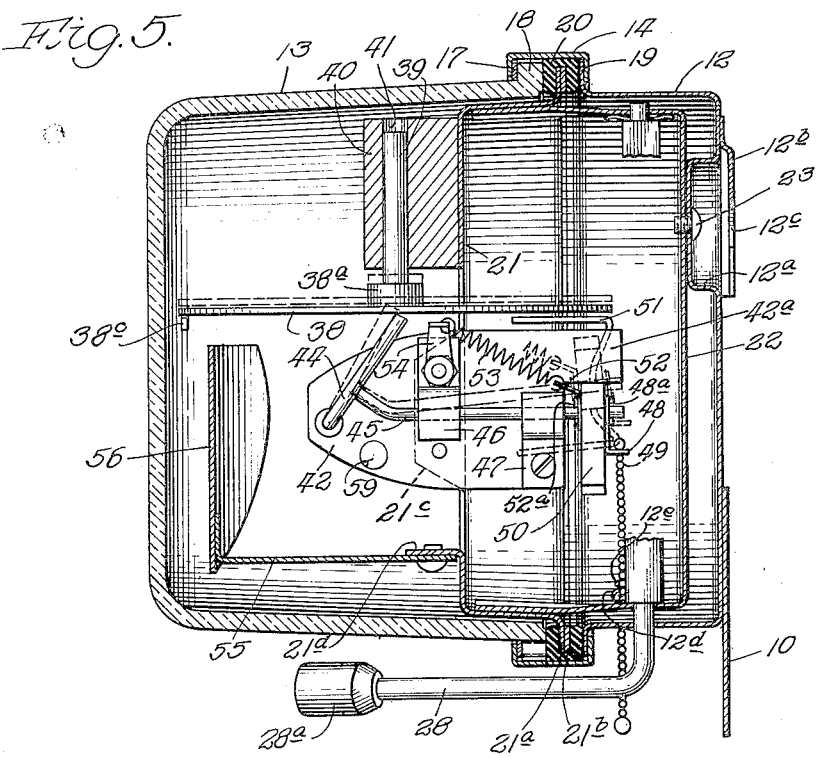
Figure 6:
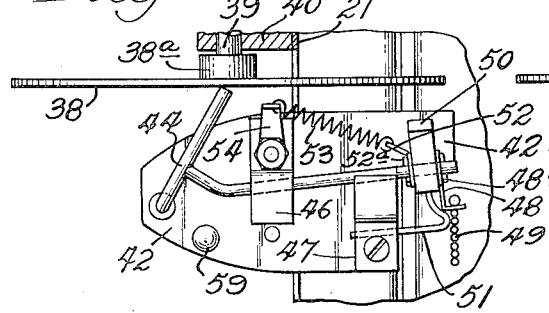
Figure 7:
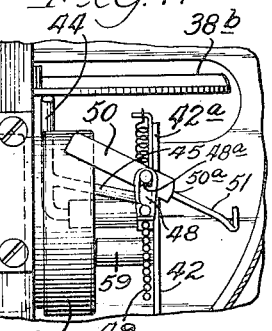
Figure 8:
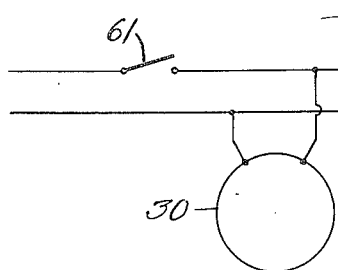

One feature of this invention is that, by properly timing the milking operation, each cow is milked in such manner as to impose the least strain on her, both physically and mentally; another feature of this invention is that it greatly improves the speed of milking of a herd of cows, particularly where one man handles several milkers; yet another feature is that the milking controller or timing arrangement is so designed and constructed as to be particularly suitable for use in the conditions encountered in the average dairy barn, where there are particles of straw and dirt in the air, where the temperature may drop below freezing in the winter, etc.; yet another feature of this invention is that the timing arrangement provides an indication of when the milking of the cow should be terminated; a further feature of this invention is that the timing means is adapted continuously to provide the desired indication automatically and periodically, or, selectively, to provide an indication at the end of the milking period and to be restarted when the next milking period is to be initiated; and still a further feature of this invention is that the period or frequency of the indication may be readily and easily adjusted in accordance with the desired milking period and the number of milkers being handled by one man. Other features and advantages of this invention will be apparent from the following specification and the drawings, in which:

Figure 1 is a front elevational view of a milking controller or timer embodying my inventions; Figure 2 is a sectional view along the line 2—2 of Figure 3; Figure 3 is a sectional view along the line 3—3 of Figure 1; Figure 4 is a sectional view along the line 4—4 of Figure 2; Figure 5 is a sectional view along the line 5—5 of Figure 1; Figure 6 is a detail view of the disk raising device as shown in Figure 5 after said device has been unseated by the pin on the revolving disk; Figure 7 is a detail view of the disk raising device as shown in Figure 4 but after said device has been unseated by the pin on the disk; and Figure 8 is a circuit diagram.

In dairies, particularly of the better grade, practically all milking is now done by milking machines; and in the interest of efficient utilization of a man's time during milking, one man generally handles from two to four milking machines. Under-milking, of course, not only results in reduced milk output, but is also detrimental to the cow in that there is an undesirable residual carry-over in the udder. Over-milking, on the other hand, is also very undesirable. One of the factors in such regard is that floor-type milking machines, if left operating after the udder has been emptied "creep" up above the top of the teat, pulling part of the loose or slack udder down into the inflation, with attendant pinching and actual physical injury. Moreover, the application of continued mechanical squeezing, and of vacuum, to the teat for a substantial period after that quarter of the udder is emptied can and sometimes does cause other physical harm. Moreover, good producing cows of the kind now found in better dairies have a highly developed nervous system, so that undesirable nervous reactions take place, detrimental to the milk output, if the cow is not milked in the most efficient and comfortable manner.

It has been found that the majority of the cows in a given herd, particularly where they are all of a given breed, can be trained to milk out in approximately a given period of time. It has been found that the mental and physical well-being of the cow, and her milk output, are greatly improved if she is trained to milk out in a definite time, preferably about the fastest time in which she can give down all of her milk, and is then always milked for this period.

Some efforts have heretofore been made to provide milking timers, as for example that shown in Gengler Patent 2,351,675, which may be referred to for further discussion of the advantages of timed milking, if desired. The timer shown in that patent, however, has never gone into commercial use because of its failure to recognize and solve certain problems incident to successful milking timing in a dairy barn or milking parlor, particularly where one operator handles a plurality of milkers, as is almost always the case in a well-run dairy.

Referring now to the specific embodiment of my invention illustrated in the accompanying drawings, the timer comprises a unit adapted to be mounted on a wall of the barn or in some other place conveniently near where the milking is carried on. As may be best seen in Figures 1 and 5, the unit is shown as provided with a hanging bracket 10 adapted to be fastened to a wall by passing screws or nails through the holes 11. This bracket is secured to a cup-shaped metal housing 12 adapted to be attached to a cup-shaped transparent housing 13 by means of a channel-shaped closure or clamping ring 14 split at one portion and having its adjacent ends adapted to be pulled together by any convenient means, as the bolt 15 and nut 16. The outer flange of the ring 14 overlies a metal gasket 17 which is positioned against a series of protuberances 18 formed integral with and extending outwardly from the inner end of the cup member 13. The inner flange of the ring 14 overlies an outwardly extending flange 19 on the cup member 12. Positioned between the protuberances 18 and flange 19 is a rubber gasket ring 20 serving to insure a snug, tight relationship of the parts when the closure ring is drawn up, to provide a dust proof, moisture proof housing.

In the housing formed by the cup members is a metal cup-shaped frame or support member 21 to which is soldered, or otherwise attached, a metal U-shaped frame member 22. These members provide a mounting for most of the parts of the device as will be more fully described hereafter. The member 21, which, as shown, is in the front of the device, is provided with an annular flange 21a to which is soldered a support ring 21b, both the flange and ring being received in a groove in the gasket 20 to thereby anchor the frame member 21 in the housing. The rear frame member 22 is also secured to the rear housing member 12 by means of a bolt 23 extending through complementary threaded openings in a well 12a of the housing and in the upper part of the body part of the member 22 (see Fig. 5). A plate 12b is secured to the member 12 to cover the well 12a. This cover plate is provided with an open portion 12c to permit access to the bolt 23.

Mounted on the front of the body portion of the frame member 21 is an indicating light bulb 24 of low wattage (6-8 watts). The socket 24a for this bulb extends through an opening in the member 21 and is mounted in a bracket 24b attached to the rear of said member. Behind the light and mounted on a bracket 25, secured to the rear frame member 22, is a buzzer 26 of the type in which a D. C. relay is employed to provide a more heavy-duty device than the conventional spring-arm buzzer. The reciprocating member 26a of the buzzer is attached to a spring 26b connected to an arm extending from the bracket 25.

Between the arms of the frame member 22 is a square shaft 27 having a stud extending through an opening in the upper arm and a rod 28 extending through an opening in the lower arm so that the shaft may rotate between said arms. The rod 28 extends through an opening in the lower part of the member 22 and then is bent forwardly and provided with a handle 28a at its forward end. A bracket 29 is attached to and extends forwardly of the lower part of this shaft and on it is mounted a small synchronous electric motor 30 of the kind designed for and commonly used in electric clocks. No specific disclosure of the interior of this motor is felt necessary, as reference may be had to prior art patents, for example Haydon Patents 1,977,186 and 2,049,261, for a full disclosure of the structure and operation of commercially obtainable motors of this type, together with associated reduction gearing which may be built therein to produce a reduced speed output as for example one revolution per minute. The slow speed output shaft of this motor is connected to a shaft 31 which extends through the bracket 29 and has a rubber rimmed drive wheel 32 keyed thereto.

Above the bracket 29 is another smaller bracket 33 secured to the shaft 27 and extending forwardly thereof. Near the front end of the bracket is pivotally secured by means of bolt 33a a mounting plate 34 on the front end of which is a freely rotatable driven wheel 35 and in back of which is mounted a pair of clamps 36 in which is held a mercury switch 37. Between the wheels 32 and 35 is a circular disk 38 in the upper center of which is an integral collar 38a adapted to receive a shaft 39, the shaft and collar being keyed to each other as by a bolt extending through a threaded opening in the collar. The frame member 21 is cut out to receive the disk 38 and is also provided with a forwardly extending projection 40 having a circular opening 41 therethrough into which the shaft 39 extends. The diameter of the opening 41 is of sufficient size to permit free longitudinal and rotational movement of the shaft in the opening. The disk 38 is provided with an arcuate raised portion 38b on its upper face and a pin 38c depending from its lower face near the periphery thereof.

The lower left hand portion (as viewed in Fig. 1) of the face of the frame member 21 is cut out and provided with a vertical flange 21c to which is bolted a plate 42 extending from a point near the front of the disk to a point adjacent the rear thereof and with its upper rear portion 42a extending well beyond the disk. This plate has secured to it a projection 43 with a central opening therein providing a bearing for the end of an arm 44 which extends outwardly and then curves upwardly to the lower face of the disk 38. This arm 44 is rotatable in its bearing, movement of the arm being adapted to raise the disk 38 out of contact with the drive wheel 35. Movement of the arm 44 is controlled by an arm 45 attached thereto about midway of its length, the arm 45 extending to the plate 42 and then being bent rearwardly through slots formed by brackets 46 and 47, an end of each of which is attached to the plate 42 (see Fig. 5). The arm 45 extends to a point below the end of portion 42a of the plate 42 where it is connected by a link 48 to a chain 49 which hangs downwardly and extends through an opening 12d in the housing member 12 to a point below the device. The opening 12d is provided with a notch 12e in which the chain may be locked. In front of the link 48 is a weighted member 50 having an opening in its upper portion through which the arm 45 extends and having a curved rod 51 extending upwardly and forwardly therefrom. Directly in front of the member 50 is a link 52 around the arm 45 and connected by a spring 53 to a bracket 54 secured to the upper front portion of the plate 42. Two cotter pins 48a and 52a prevent the links 48 and 52 and member 50 from longitudinal movement on the arm 45 but permit free pivotal movement of the parts on this arm. The upper end 50a of the member 50 is chamfered slightly providing shoulders adapted to be seated under the projection 42a of the plate 42 (see Fig. 4) in which position the member is maintained by the upward pull of the spring 53.

When the pin 38c unseats the member 50 the spring 53 is sufficiently strong to raise the arm 45 toward the top of the notches formed in the brackets 46 and 47 and carry with it the weighted member 50. Upward movement of the arm is arrested when the upper or top edge 50a of the member 50 contacts the lower edge of the projection 42a. The arm 45 being to the side of the projection 42a this contact tends to raise the lower end of the member 50 until it assumes the position shown in Figs. 6 and 7. This raises the arm 44 and with it the disk 38 which is thereby removed from contact with the drive wheel 32. This is shown in dotted lines in Fig. 5. When the chain 49 is pulled down the side of the member 50 no longer contacts the projection 42a and inasmuch as most of the weight of the member 50 and arm 51 is below the arm 44 it tends to assume an upright position and its upper end swings toward and then seats under the projection 42a, in which position it is locked and thereby locks the arms 45 and 44 in the position shown in Figs. 4 and 5 where the arm 44 exerts no pressure against the disk 38 and permits it to rest on and be driven by the drive wheel 32. When the pin 51 is contacted by the pin 38c on the disk 38, however, the pin 51 and with it the member 50 is tilted to such an extent that the chamfered shoulder of the member 50 is moved out from under the projection 42a thereby unlocking the parts and permitting the spring 53 to act upon and raise them. The pin 51 may be removed entirely from the path of the pin 38c by pulling the chain 49 until the arm 45 contacts the lower ends of the slot formed by bracket 47 and then locking the chain in this position by sliding it into and catching it in the notch 12e of the opening 12d.

The lower front face of the frame member 21 is broken away and formed with a horizontal flange 21d to which is bolted an L-shaped bracket 55 on the front end of which is a curved indicator panel 56. (See Figs. 1 and 5.) The plate 29 on which the motor and drive wheel are mounted has a projection 57 extending outwardly therefrom and carrying a curved arm 58, the end of which extends over the upper portion of the panel 56. An inwardly extending projection 59 is provided on the plate 42 which is adapted to contact the motor 30 and thereby limit the movement of it and its associated parts in that direction. At this point the drive wheel is so positioned under the disk 38 that one rotation of the drive wheel will result in one rotation of the disk. When the handle 28a is turned to the right the drive wheel will be moved to positions where it will require more than one rotation of the drive wheel to rotate the disk once. In the embodiment shown the wheel may be moved to a point where it will require four rotations of the drive wheel to rotate the disk once. In other words the disk will revolve once every four minutes as the drive wheel rotates once per minute. Intermediate positions may be chosen by turning the handle until the indicator is over the desired point on the panel.

As shown in Fig. 4 the device is adapted to be connected to a source of electricity through the cord 60 which passes through an insulated opening in the housing 12 and is adapted to be plugged into any convenient outlet supplying alternating current. The circuit, as shown in Fig. 8, includes the on-off toggle switch 61, the motor 30, the light 24, buzzer 26 and mercury switch 37. To eliminate electric shocks to the users and to minimize danger from lightning a ground wire 62 is connected to the timer. Upon turning the toggle switch to "on" position the motor is energized to drive the wheel 32 at the rate of 1 R. P. M. The wheel then drives the disk 38 at the desired speed, the handle 28 being moved until the indicator 57 is above the time desired for a revolution of the disk. As the disk rotates the wheel 35 rides on its upper surface and being heavier that the switch 37 tilts the switch slightly forward so that the mercury remains in the forward part of the tube, this keeping the switch open. When the raised portion 38b of the disk contacts the wheel 35 it acts to raise the wheel and tilt the tube so that the mercury flows to the back of the tube and closes the switch, thereby completing the circuit to the light 24 and buzzer 26. The wheel is so raised for only six to eight seconds, for example, and then the raised portion 38b passes the wheel and is lowered to the surface of the disk 38 to re-open the switch 37.

The pin 38c on the wheel is so positioned with respect to the raised portion 38b that a few seconds after the switch connection 37 is broken the pin will contact the pin 51 and move it sufficiently to release the member 50 from its position under the projection 42a, whereupon the spring 53 acts to raise the arms 45 and 44 and move the disk out of engagement with the drive wheel and thereby prevent its further rotation until the chain 49 is pulled to reseat the member 50 and lower the arms 44 and 45 and the disk 38, provided the operator has chosen to leave the chain free to so move. This is used with the non-continuous type of operation where but one cow is milked at a time.

When a plurality of cows are being milked, the device is preferably set for continuous operation by pulling the chain down and catching it in the notch in the opening thereby removing the pin 51 from the path of the pin 38c, either entirely or to such an extent that the pin 38c will not unseat the member 50. The method of determining the proper positioning of the timer and its use in such continuous operation will now be described.

It is quite general practice for an efficient dairy man to handle two or three milkers, and sometimes even four. In this description it will be assumed that a suspended milker of the kind shown in McCornack Patent 1,859,213 is the type being used for the milking. In a milker of this type the bucket is suspended beneath the belly of the cow, immediately ahead of the udder, by a supporting arrangement including a surcingle strap thrown across the back of the cow and a metal bow beneath the belly of the cow on which the milker handle is hooked. Usually two suspension arrangements are provided for each milker bucket, so that the surcingle and bow may be arranged on the next cow to be milked with a given milker, and the milker merely removed from one cow and hooked on to the next. The operator can then go back and remove the suspension arrangement from the cow just milked, and place it on the next cow to which the milker is to be moved at the end of a certain period of operation on the cow on which it is then milking. Also, the milking operation will be described as taking place in a conventional barn having a plurality of stalls in a row, with a vacuum line extending along the back of each row and having a stall cock associated with each stall. It will be understood, however, that my milking controller and milking method are useable with other types of milkers and with other barn or milking parlor arrangements.

In milking in a dairy barn by the use of a milking controller or timing arrangement of the kind heretofore described, certain milking timing tests would first have to be run on the cows. Normally a group of good dairy cows, particularly if they are of the same breed, will milk out in approximately the same period after they have been trained to the fact that the milker will be promptly removed at the end of that period. There may be a cow or two in the herd which milks out very much more quickly than the average, as newly freshened heifers, and there may be a cow or two which require a substantially longer time than the average, as a cow with unusually high milk producing abilities or a cow with an udder or teat deformity, for example. These cows would be placed at the end of a row or in a separate row or section, however, and milked separately, the timer being set for each cow and for non-continuous operation. The cows with respect to which this description is concerned are what may be termed the "average" cows of any given dairy herd, which will normally comprise substantially all of the herd. After tests have been run to determine the interval during which a milking machine must be operative on the cow to secure all of her milk, what may be termed the handling or changing time for moving a milker from one cow to another is also determined, and these are added together to get what is here being termed the desired milking period. That is, if the milker must be in operation on the cow for three minutes, and the operator finds that it takes him one minute to remove the milker from one cow, dump its contents, and place it on the next cow and render it operative, the desired period to be timed by the milking controller would be four minutes. While the period panel 56 will be understood to include a number of graduations, it is shown provided with "1," "2," "3," and "4" minute graduations for simplicity of illustration. It will be understood, of course, that the period during which the milker should be operative on the cow may vary anywhere from a minute and a half up to four or five minutes, normally speaking, but the desired period to be timed by the milking controller will usually be between three and four minutes, a four minute period here being described as representative.

At the beginning of the milking operation the operator may turn the switch 61 to "on" position and see that the adjusting indicator 58 is set to the proper position. If the desired period is four minutes and the operator is going to handle several milkers, the setting of the indicator 58 would be the desired period divided by the number of milkers to be handled. On the assumption that the desired period is four minutes and that the operator is going to handle two milkers the adjusting indicator is set at the "two minute" adjustment so that there would be an audible indication by the buzzer 26 every two minutes, this continuing automatically and periodically throughout the entire course of the milking, without any attention by the operator. The timing device shown in the above-mentioned Gengler patent is particularly objectionable for farms in that it requires attention and resetting of the operator between each indication, and in that it is not designed or adapted to enable one man to handle several milkers.

After the operator has started the timer and adjusted it properly, he would put suspension arrangements in place on the first two cows to be milked. He would then hang the milker from the suspension in operative relation to the cow, slip the vacuum hose on the stall cock, open the stall cock and, preferably waiting for about one minute after an indication provided by the buzzer, slip the four teat cups up in place so that the milking machine started milking substantially one minute after an audible signal. He would then move to the second cow in the row and repeat this operation, the delay in rendering a milker operative after the first timing indication being intended to be the equivalent of the handling time which will be subsequently involved in moving the milkers from one cow to another. Assuming that cow No. 1 had the milker rendered operative after indication No. 1, and that cow No. 2 had her milker rendered operative a minute after indication No. 2, the operator would then place one of the spare suspension arrangements on cow No. 3 and, as soon as he heard indication No. 3, remove the milker from cow No. 1, empty it, and place it in operation on cow No. 3. This would, of course, involve shutting off the stall cock, pulling off the vacuum hose, unhooking the milker, dumping the milk into a milk can or other receptacle, walking to the stall of cow No. 3, hanging the milker on the suspension, slipping the hose on the stall cock, turning the cock on, and slipping shells and inflations up on to the teats. The operator would then have about one minute left before indication No. 4, and he would use this time to move the suspension arrangement from cow No. 1 to cow No. 4. Immediately upon hearing indication No. 4 he would then remove the milker from cow No. 2, empty it into the can, and place it in operation on cow No. 4. This process would then be carried on in similar steps down the row of stalls and throughout any succeeding rows of stalls to be milked, the milker being moved from cow No. 3 to cow No. 5 on indication No. 5, etc. By use of this accurate timing controlling, the only variable is the handling time, and the man would usually get the milker from one cow to another without more than a few seconds variation in his handling or moving time, so that each cow would have the milker operative on her for the three minute interval determined as optimum for the particular cows being milked, without more than a few seconds variation one way or the other.

While the milking operation has been described above in connection with a single man handling two milkers, it will be understood that a good dairy man can generally handle three milkers, and that the system is equally operative under such conditions. If three milkers are to be handled the indicator 57 would be moved so that the indicator is over the point on the scale representing 1⅓ minutes, the desired four minute period divided by three milkers. Under these conditions the buzzer would operate for a few seconds once every minute and a third. The operator under these conditions would render the milker on cow No. 1 operative about a minute after indication No. 1, on cow No. 2, about a minute after indication No. 2 and on cow No. 3 about a minute after indication No. 3. He would then have a third of a minute to hang the surcingle on cow No. 4 and upon indication No. 4 would move the milker from cow No. 1 to cow No. 4, emptying it on the way, of course. He would then move the surcingle from cow No. 1 to cow No. 5 and upon indication No. 5 move the milker from cow No. 2 to cow No. 5. This same sequence of operations would continue, and it will be seen that again each cow would have the milker in actual operation on her for three minutes.

In a good sized dairy barn, there is usually more than one operator and more than one timer is required and it is for that reason that it is advisable to have both a visual and an audible indication on the timer. The timer is, therefore, provided with a light, which is turned on while the buzzer is in operation enabling the workers to glance up when he hears a buzzer and ascertain if the signal is from his timer, timers being distinguishable by position or by different colored lamps; or different toned buzzers may be used, if desired.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A milking timer comprising: timing means adapted to operate continuously; indicating means; means for actuating said indicating means; and means to selectively operate said actuating means continuously or to render it inoperative after an indication.

2. In a dairy installation wherein there is a plurality of stalls, a milking timing arrangement including: timing means adapted to operate continuously; indicating means; and apparatus driven by the timing means for automatically periodically actuating the indicating means, at desired intervals, said apparatus being variable for providing different desired time intervals.

3. A milking timer comprising: timing means adapted to operate continuously; indicating means; apparatus driven by the timing means for actuating said indicating means, said apparatus being variable; means for moving said apparatus out of engagement with said timing means; and means for selectively rendering said moving means inoperative.

4. A milking timer comprising: a driving means; a disk driven thereby; indicating means; means on said disk adapted to actuate said indicating means; and means actuated by said disk for moving said disk out of engagement with said driving means after each indication.

5. A milking timer comprising: a motor having a drive wheel; a rotatable disk engaging said drive and driven thereby wheel; means for varying the relative position of said wheel and to vary the timed period disk; indicating means; and means on said disk for actuating said indicating means.

6. A device of the character claimed in claim 5 wherein the means for actuating the indicating means is a projection on the disk adapted to close a switch connected to the indicating means.

7. A milking timer comprising: a motor having a drive wheel, a rotatable disk above said drive wheel and frictionally driven thereby; a projection on said disk; a member contacting the upper surface of said disk and pivotally connected to a switch; and an indicating means electrically controlled by said switch, said disk and member being so constructed and arranged that when the member contacts the projection the member will close the switch to operate the indicating means.

8. A milking timer comprising: a motor having a drive wheel; a rotatable disk driven by said wheel; indicating means; means on said disk for actuating said indicating means; means for moving said disk out of engagement with said wheel after each indication; and means on said disk for actuating said moving means.

9. The device claimed in claim 8 including means for rendering said two last mentioned means inoperative whereby to provide continuous periodic operation of the indicating means.

10. The device claimed in claim 8 wherein the drive wheel may be moved to vary the speed of the disk.

11. In a dairy installation wherein there is a plurality of stalls, a milking timing arrangement facilitating the efficient handling of a plurality of milkers by a single operator, including: timing means adapted to operate continuously; indicating means; adjustable apparatus driven by the timing means for actuating the indicating means, this apparatus having a member which may be operated to automatically periodically effect operation of the indicating means at intervals equal to the desired milking period divided by the number of milkers being handled; a dust proof housing for said timing means and apparatus; and adjusting means for said apparatus, this adjusting means including a manually movable member on the outside of said housing.

12. The method of controlling milking where a plurality of milkers are handled by a single operator, including: automatically periodically providing an indication from a timing arrangement, said indication occurring at intervals equal to the desired milking period divided by the number of milkers being handled; and successively transferring milkers from one cow to another at each such indication.

LORELL JOHN SCHILLING.

REFERENCES CITED

The following references are of record in the file of this patent:

UNITED STATES PATENTS

| Number | Name | Date |
| --- | --- | --- |
| 1,471,394 | Frimand | Oct. 23, 1923 |
| 1,763,509 | Gates | June 10, 1930 |
| 1,915,516 | Carpenter | June 27, 1933 |
| 1,977,860 | Pinto et al. | Oct. 23, 1934 |
| 2,050,356 | McCornack | Aug. 11, 1936 |
| 2,076,290 | Bliss | Apr. 6, 1937 |
| 2,224,593 | Brown et al. | Dec. 10, 1940 |